M. W. COON.
Harvesters.

No. 151,760.    Patented June 9, 1874.

Witnesses
John L. Borne
C. M. Richardson

Inventor
Melzar W. Coon
by Dewey & Co
Attys

UNITED STATES PATENT OFFICE.

MELZAR W. COON, OF PLAINFIELD, CALIFORNIA.

IMPROVEMENT IN HARVESTERS.

Specification forming part of Letters Patent No. 151,760, dated June 9, 1874; application filed March 31, 1874.

*To all whom it may concern:*

Be it known that I, MELZAR W. COON, of Plainfield, Yolo county, State of California, have invented an Adjustable Bearing for Operating Header-Levers; and I do hereby declare the following description and accompanying drawings are sufficient to enable any person skilled in the art or science to which it most nearly appertains to make and use my said invention without further invention or experiment.

The object of my invention is to provide an adjustable bearing device for operating header-levers; and, it consists in the use of a secondary bar or lever, which is pivoted to the main lever near to its point of attachment to the frame, and, passing through a slide upon the header-frame, is attached to a link which is pinned to the tongue or pole, so that I am enabled to elevate and depress the header-frame with much less exertion of power, and also to obtain the necessary movement of the frame without too great a movement of the lever.

Figure 1:
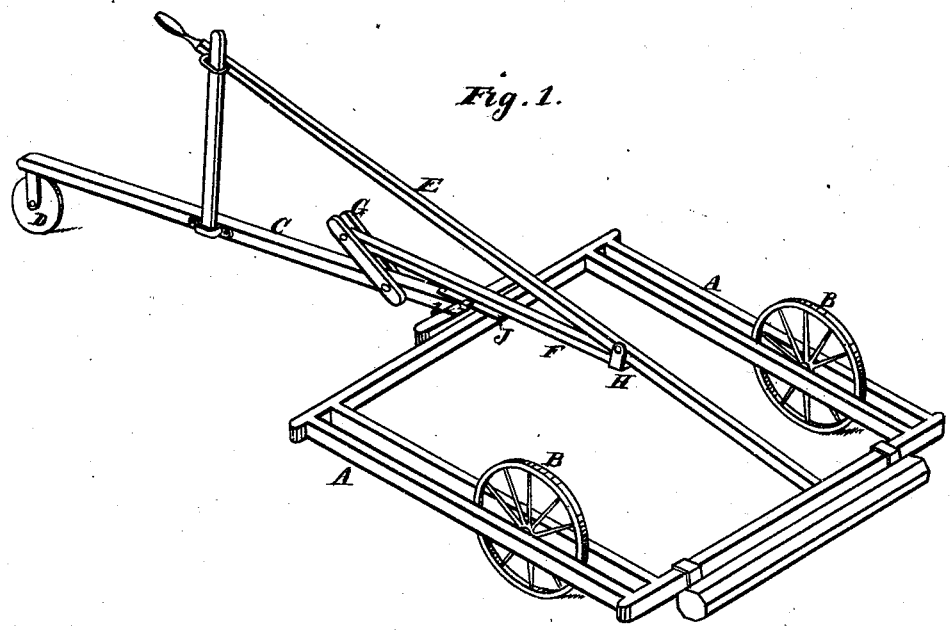
Figure 2:
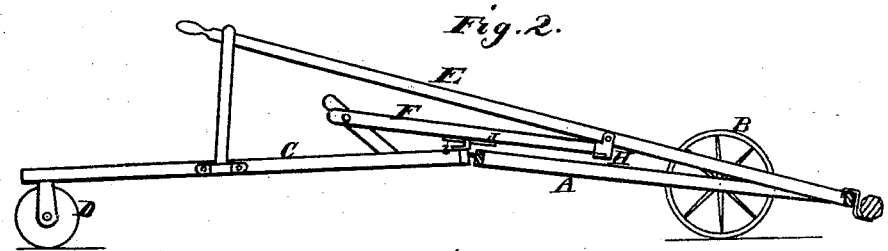
Figure 3:
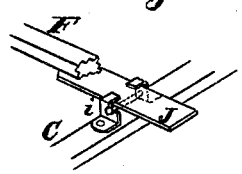

Referring to the accompanying drawings for a more complete explanation of my invention, Figure 1 is a perspective view of my device attached to a header-frame. Fig. 2 is a longitudinal section of my device, and the header-frame, with the front depressed. Fig. 3 is a view of the guide.

A is a header-frame, and B B are the bearing-wheels. C is the pole, which is hinged to the rear of the frame A at its front end, while its rear end is supported by the steering-wheel D. The horses are harnessed upon each side of the pole, and draw with their heads toward the frame A. The lever E, by which the machine is operated so as to cut in high and low grain, has a handle within easy reach of the driver, and its front end is secured to the front beam of the frame A just behind the grain belt. Ordinarily this lever has another point of attachment to a post upon the rear beam of the frame, but this makes it very heavy to operate, and it is often necessary to attach a weight to assist. In my improvement, I employ a short bar, F, which has one end hinged to the lever E below, and at a point, H, near to the rear beam of the frame A. This bar extends back beneath the lever, and has its rear end hinged to the link G. This link extends down to the pole C, to which it is hinged, as shown.

A plate, $i$, is secured to the pole near the front, at which it is hinged to the frame A, and is provided with lugs, between which a roller is placed, and a plate on the bottom of the bar F moves upon this roller, being also held to its place by the lugs, which are turned over upon it so as to form guides, between which it slides.

By bringing the lever E to the bar F, as shown, I am enabled to obtain a better leverage, so that less power is needed to operate the header-frame, while, by means of this bar, carried back and linked to the pole, the distance which it is necessary to raise or depress the lever will be decreased.

Having thus described my invention, what I claim, and desire to secure by Letters Patent, is—

The bar F, hinged to the lever E at H, and linked to the pole at G, and passing through the guides with the roller $i$, all combined substantially as and for the purpose herein described.

In witness whereof I hereunto set my hand and seal.

MELZAR W. COON. [L. S.]

Witnesses:
N. B. S. COLEMAN,
V. N. COLLINS.